(No Model.)
P. DIEHL.
ELECTRIC MOTOR.
No. 411,983. Patented Oct. 1, 1889.
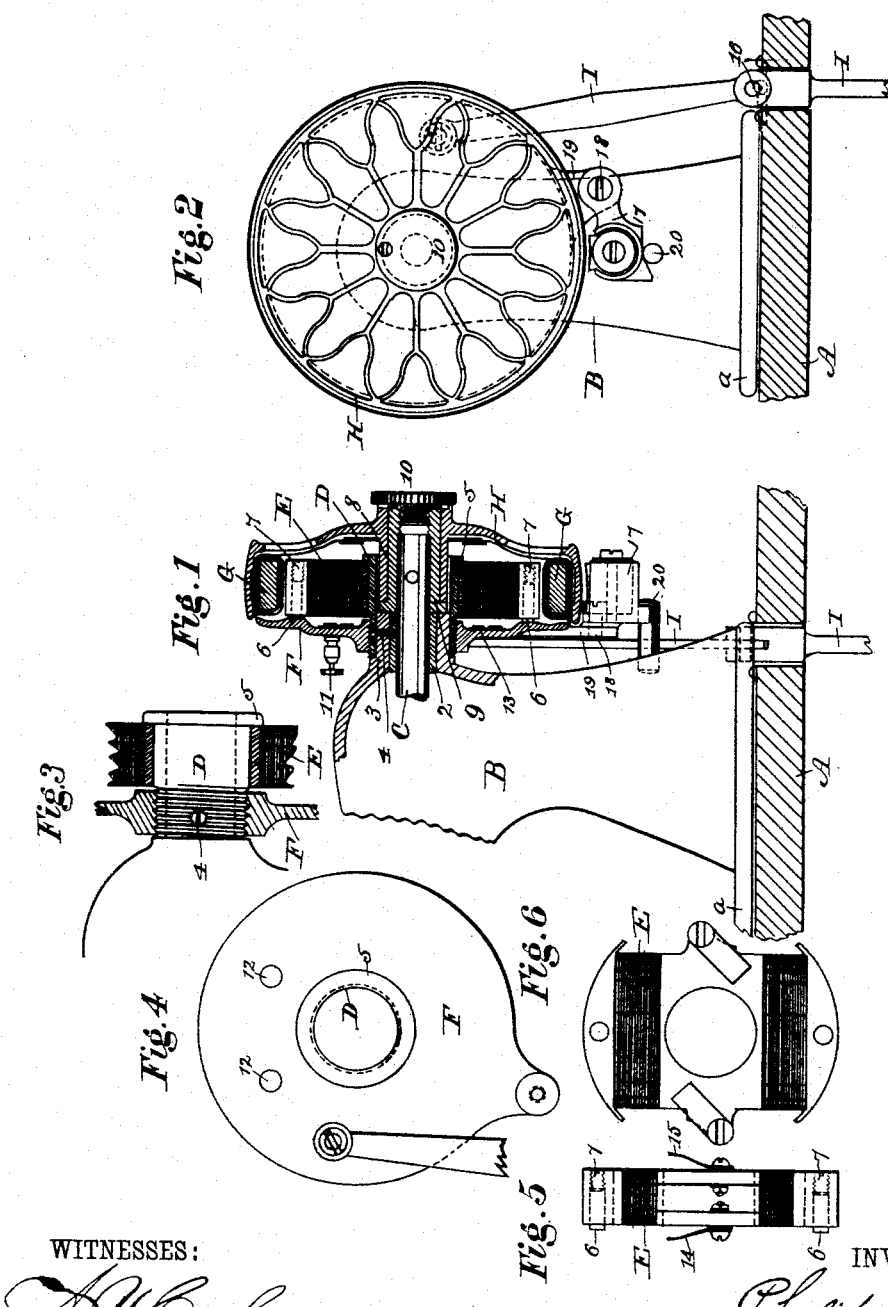
WITNESSES:
INVENTOR
Philip Diehl

UNITED STATES PATENT OFFICE.

PHILIP DIEHL, OF ELIZABETH, NEW JERSEY.

ELECTRIC MOTOR.

SPECIFICATION forming part of Letters Patent No. 411,983, dated October 1, 1889.

Application filed April 20, 1889. Serial No. 307,918. (No model.)

*To all whom it may concern:*

Be it known that I, PHILIP DIEHL, a citizen of the United States, residing at Elizabeth, in the county of Union and State of New Jersey, have invented certain new and useful Improvements in Electric Motors, of which the following is a specification, reference being had therein to the accompanying drawings.

The object of my invention is to provide an electric motor of such construction that the speed thereof may be regulated without the use of resistance-coils or other similar regulating devices, my motor being preferably so constructed that the power thereof may be applied directly to the shaft to be driven without the use of belts or gearing.

In carrying my invention into effect the field-magnet and armature are so arranged that either may rotate while the other is at rest, or both may rotate at the same time, but in opposite directions. Thus if it be desired to utilize the entire force of an electric current to operate the motor at its greatest speed, the field-magnet will be clamped or held stationary, thus giving the entire rotative power of the motor to the armature, while if it be desired to reduce the speed of the motor the frictional clamp which is adapted to hold the field-magnet stationary may be more or less released to permit the said magnet to rotate more or less. The greater the rotation of the magnet the less will be the rotation of the armature, from which latter the power is preferably conveyed to the shaft to be driven. Thus the speed of the motor may be regulated as may be desired without variation of the current operating the same.

If it be desired to stop the shaft driven by the motor, the field-magnet is entirely released, and simultaneously therewith a brake is applied to the armature-wheel, so that as the latter is stopped the whole force of the current will operate to rotate the magnet, and thus the driven shaft may be stopped without breaking the circuit.

In the accompanying drawings, Figure 1 is a sectional elevation showing part of a sewing-machine with my improved motor applied thereto. Fig. 2 is a rear end view of the same. Fig. 3 is an enlarged detail of the clamping-sleeve on which the field-magnet rotates, with parts of said magnet and of the clamping-disk. Fig. 4 is a detail view of the clamping-disk, and Figs. 5 and 6 detail views of the field-magnet.

A denotes the table, and B the arm, of a sewing-machine.

C is the main shaft of the machine, journaled in the present instance in a bushing 2 in the hub 3 of the arm B. Attached to the hub 3, in any suitable manner, as by a set-screw 4, is a sleeve D, having a flange 5, a plain portion, on which is loosely mounted the field-magnet E, and a threaded portion, on which is mounted the clamping cover plate or disk F, the central orifice of said disk being threaded to fit the threaded part of the sleeve. The field-magnet is provided with non-metallic friction blocks or plugs 6 to bear against the clamping-disk, said blocks or plugs being adjustable by screws 7 to vary their positions or to compensate for wear.

G is an ordinary ring or Gramme armature surrounding the field-magnet and attached to the interior of the hollow fly or armature wheel H, the hub 8 of which is in the present instance mounted loosely on the sleeve 9, attached to the shaft C, said hub 8 being connected with said shaft by an ordinary "stop-motion" device, herein shown as a clamping or clutch screw 10, which clamps the hub of the wheel H between itself and a flange at the inner end of the sleeve 9. This connection of the fly-wheel H to the shaft C is provided for the convenience of running the said wheel loosely or independently of said shaft when it is desired to wind bobbins without running the machine, as is common in sewing-machines; but it is obvious that the said wheel may be secured directly to the shaft to be driven, if desired. As the field-magnet is to rotate at times, the binding-screws 11 for the terminals are attached to the clamping-disk F, as at points 12, Fig. 4, and the interior of said disk is provided with rings 13, of copper or other suitable conducting material, against which brushes 14 on one side of the field-magnet impinge, commutator-brushes 15 being attached to the opposite side of the field-magnet.

To the disk F is attached a pitman I, by which said disk may be partially rotated to clamp or release the field-magnet, said pitman being jointed at 16 just above the level of the top of the table A and on a line with the pivot-hinges, by which the bed-plate $a$ of the machine is attached to said table, the jointing of the pitman in this manner permitting the sewing-machine to be turned up on its hinges without disconnecting the pitman from the clamping-disk.

To stop the rotation of the fly and armature wheel simultaneously with the unclamping of the field-magnet, I provide a brake consisting of a block of suitable friction material carried by a lever 17, pivoted at 18 to a projection 19 on the disk F and provided with an inclined lower side resting on a pin or projection 20 on the arm A. Thus as the disk F is turned to unclamp the field-magnet the lever 17 rides up the pin 20, forcing the friction-block carried by the brake-lever against the rim of the fly or armature wheel to arrest the movement thereof, and when said disk is moved in the opposite direction to clamp the field-magnet the brake is disengaged from the wheel, leaving the latter free to rotate.

In the operation of my improved motor, when it is desired to check the rotation of the fly or armature wheel the pitman I (operated from a "heel-and-toe" treadle) will be moved upward, partially rotating the disk F and partially unclamping the field-magnet. The said magnet will then begin to rotate in a direction the reverse of that of the armature-wheel H, thereby decreasing the relative resistance between said magnet and the armature and correspondingly decreasing the speed of rotation of said wheel, and if the said pitman be moved up far enough to entirely release the magnet and to bring the brake into forcible contact with the rim of the wheel, as hereinbefore described, the latter will be stopped and the full power of the current will be directed to the rotation of the magnet. To start the wheel again, the pitman is lowered, causing the clamping-disk to engage the friction-blocks of the magnet and clamping the latter more or less tightly, as may be desired, between the disk and the flange 5 of the sleeve D, and thus the speed of rotation of the fly or armature wheel H (which is in the acting part of the motor) may be regulated at will.

I claim—

1. In an electric motor, the combination, with a shaft to be driven, of a rotary armature normally connected with said shaft to rotate therewith, a field-magnet adapted to rotate independently of said shaft when desired, and means for frictionally holding said magnet or armature more or less tightly to regulate the movement of the active part of the motor.

2. In an electric motor, the combination, with a rotary field-magnet and rotary armature, of a clamping device for frictionally holding one or both of said parts more or less tightly, and comprising a normally stationary disk or plate to which the circuit-terminals are attached and which is provided with contact-rings to be engaged by brushes on the armature.

3. In an electric motor, the combination, with a rotary field-magnet provided with friction plugs or blocks, of a sleeve having a threaded portion, a plain portion on which said magnet is loosely mounted, and a flange at its end opposite to said threaded portion, a clamping-disk having an orifice interiorly threaded to engage said threaded portion of the sleeve, an armature surrounding said field-magnet, a wheel by which said armature is carried, a brake to engage said wheel, and a driven shaft with which said wheel is operatively connected.

4. In an electric motor, the combination, with a shaft to be driven, of a field-magnet adapted to rotate independently of said shaft when desired, means for frictionally holding said magnet more or less tightly, a rotary armature, a wheel carrying said armature and which is normally connected with said shaft to rotate therewith, and a brake for arresting the movements of said wheel when the frictional hold on the magnet is relaxed.

5. In an electric motor, the combination, with a rotary field-magnet and a clamping disk or plate for frictionally holding the same more or less tightly, of a rotary armature-wheel and a brake arranged to engage said wheel, said brake being operated by said disk or plate and adapted to be forced into contact with said wheel when said magnet is released and to be released from said wheel when said magnet is clamped.

6. The combination, with the rotary field-magnet, the clamping-disk F, the armature, and the wheel H, of the brake-lever 17, pivoted to said disk and having an inclined under side, and the arm B, having the pin or projection 20, on which said lever rests.

7. The combination, with the arm A, having the hub 3, of the sleeve D, attached to said hub and having plain and threaded portions, the rotary field-magnet mounted loosely on said plain portion, the plate or disk mounted on said threaded portion, the armature surrounding said field-magnet, the wheel H, carrying said armature and having the hub 8, the sleeve on which said hub loosely fits, the shaft C, connected with said sleeve 9, the stop-motion or clutch-screw 10, and the brake-lever operated by said disk.

8. The combination, with a sewing-machine provided with an electric motor, of a stopping and starting or regulating device for said motor, and a pitman for operating said stopping and starting or regulating device, said pitman being provided with a joint just above the level of the top of the sewing-machine table, or in the line with the pivots of the machine hinges, thereby permitting the machine to be turned up on its hinges without disconnecting said pitman.

In testimony whereof I affix my signature in presence of two witnesses.

PHILIP DIEHL.

Witnesses:
J. G. GREENE,
L. L. BURRITT.